United States Patent [19]

Nakagawa

[11] Patent Number: 4,746,706
[45] Date of Patent: May 24, 1988

[54] POLYOLEFIN PARTICLES AND PROCESS FOR PREPARING THE SAME

[75] Inventor: Masao Nakagawa, Kobe, Japan

[73] Assignee: Kanegafuchi Kagaku Kogyo Kabushiki Kaisha, Osaka, Japan

[21] Appl. No.: 20,978

[22] Filed: Mar. 2, 1987

Related U.S. Application Data

[62] Division of Ser. No. 859,589, May 5, 1986, Pat. No. 4,665,102.

[30] Foreign Application Priority Data

May 8, 1985 [JP] Japan .................................. 60-97548

[51] Int. Cl.$^4$ ......................... C08F 8/18; C08F 100/00
[52] U.S. Cl. ............................... 525/334.1; 521/50.5; 521/57; 521/59; 521/60; 522/133; 525/356
[58] Field of Search ............... 522/86, 133; 525/334.1, 525/356

[56] References Cited

U.S. PATENT DOCUMENTS

| | | | |
|---|---|---|---|
| Re. 29,350 | 8/1977 | Schoen | 522/133 |
| 3,547,866 | 12/1970 | Trieschmann et al. | 525/334.1 |
| 3,598,708 | 8/1971 | Jackson, Jr. | 522/133 |
| 3,856,766 | 12/1974 | Klug et al. | 525/334.1 |
| 3,935,181 | 1/1976 | Schoen | 522/133 |
| 4,425,206 | 1/1984 | Hutchinson | 522/133 |
| 4,500,685 | 2/1985 | Ogawa et al. | 525/343 |
| 4,593,050 | 6/1986 | Cohen et al. | 522/133 |
| 4,593,075 | 6/1986 | Rifi | 525/334.1 |
| 4,602,068 | 7/1986 | Bronstert | 522/133 |
| 4,665,102 | 5/1987 | Nakagawa | 521/59 |

FOREIGN PATENT DOCUMENTS

| | | |
|---|---|---|
| 0131937 | 1/1985 | European Pat. Off. . |
| 0132407 | 1/1985 | European Pat. Off. . |

Primary Examiner—Morton Foelak
Attorney, Agent, or Firm—Armstrong, Nikaido, Marmelstein & Kubovcik

[57] ABSTRACT

Polyolefin particles having a halogenated surface region, which are prepared by irradiating ultraviolet rays to an aqueous dispersion of polyolefin particles in the presence of a halogen gas. The polyolefin particles having a halogenated surface region have an improved property of retaining volatile blowing agents and can provide expandable particles having an improved storability in the open state.

6 Claims, No Drawings

POLYOLEFIN PARTICLES AND PROCESS FOR PREPARING THE SAME

This is a division of application Ser. No. 859,589, filed May 5, 1986, now U.S. Pat. No. 4,665,102 issued May 12, 1987.

BACKGROUND OF THE INVENTION

The present invention relates to particles of polyolefins the surface region of which is halogenated, especially such polyolefin particles containing a blowing agent, and a process for preparing the same. The polyolefin particles having a halogenated surface region of the present invention are novel materials which have not been known from any literatures.

Hitherto, expanded resin articles rich in elasticity have been prepared by using polyethylene, polypropyrene or a mixture of polystyrene and polyethylene as a raw material. However, expandable beads of these resins containing volatile liquid or gaseous blowing agents are very poor in retention of the blowing agents. Therefore, these resins cannot be sold in the form of expandable beads unlike expandable polystyrene beads, and have been sold as pre-expanded particles expanded once in a predetermined expansion ratio or as expanded articles.

It is an object of the present invention to provide polyolefin particles which can be impregnated with volatile blowing agents and which can retain the impregnated blowing agents for a long term.

A further object of the present invention is to provide expandable polyolefin particles superior in retention of volatile blowing agents.

These and other objects of the present invention will become apparent from the description hereinafter.

SUMMARY OF THE INVENTION

It has now been found that the above objects can be achieved by halogenating at least the surface region of polyolefin particles.

In accordance with the present invention, there is provided a particle of a polyolefin whose surface region is halogenated.

The polyolefin particles having a halogenated surface region of the invention are prepared by dispersing polyolefin particles in water, and irradiating ultraviolet rays to the particles in the presence of a halogen gas, thereby halogenating the surface region of the particles. A blowing agent impregnated in the polyolefin particles can be retained for a long term. The impregnation of the blowing agent can be conducted before or after the ultraviolet ray irradiation.

DETAILED DESCRIPTION

The polyolefin resins which can be used in the present invention include, for instance, low density polyethylene, high density polyethylene, linear low density polyethylene, polypropylene, ethylene-propylene random copolymer, ethylene-vinyl acetate copolymer, ethylene-styrene graft copolymer, ethylene-vinyl acetate-styrene graft copolymer, chlorinated polyethylene, and the like. The polyolefin resins may be used alone or in admixture thereof. The polyolefin resins may also be used in admixture with less than 50% by weight of other resins. Further, the polyolefin resins may be those crosslinked by a known crosslinking technique, for example, by a peroxide. Chlorinated polyethylene which is uniformly chlorinated, is poor in retention of blowing agents, but is improved by providing a barrier layer to the particle according to the present invention.

Granulation of the polyolefin resins is not limited to a particular method and can be made by known methods. Typical method for preparing polyolefin particles is pelletization by extrusion. The pelletizing conditions vary depending on the resins used, and are suitably selected according to the resins used. The pelletizing conditions are not particularly limited, but preferably they are selected so that the remaining strain of the obtained pellets is as small as possible. Also, the diameter of the particles is not limited. Particle size generally adopted for foaming of beads is usable, e.g. 0.1 to 10 mm. Usually, particles having a particle size of about 1 mm are used.

Known volatile blowing agents can be used in the present invention without any restriction. Examples of the volatile blowing agents are, for instance, a hydrocarbon such as propane, butane, pentane, hexane or heptane, a chlorofluoro hydrocarbon such as trichlorofluoromethane, dichlorodifluoromethane or dichlorotetrafluoroethane, a chlorinated hydrocarbon such as methyl chloride or methylene dichloride, and the like. The blowing agents may be used alone or in admixture thereof. Preferably, the blowing agent is impregnated in the resin particles in an amount of 3 to 30% by weight based on the resin. When the content of the blowing agent is less than 3% by weight, no desired expandable particles are obtained. Good expandable particles are obtained within the range of 3 to 30% by weight, and impregnation in an amount of more than 30% by weight is not required.

The degree of halogenation of the surface region of a polyolefin particle is determined on the basis of the maximum halogen concentration in the surface region. Preferably, in case of the particles having an average particle size of at least 0.5 mm, polyolefin particles are halogenated to the extent such that the maximum peak in the distribution of the halogen concentration measured by an X-ray microanalyser appears in the region between the surface and the 200 $\mu$m inner position of the particle and the halogen concentration for the maximum peak is at least 10% by weight (calculated from the ratio of the X-ray intensity to that of a standard substance), preferably at least 15% by weight. The standard substance used in measurement of halogen concentration by X-ray microanalyser is common salt palte (NaCl) when the halogen is chlorine, sodium bromide when the halogen is bromine, potassium iodide when the halogen is iodine, and fluorite when the halogen is fluorine. When the halogen concentration for the maximum peak is less than 10% by weight, the retention of a blowing agent is very bad.

Halogenation of only a very thin surface region of the polyolefin particles is sufficient to improve the property of retaining blowing agents, and moreover it has the advantage that the improvement is achieved without deteriorating the properties that the polyolefin resins possess originally. Halogenation of the whole particle to the inside is disadvantageous, since it takes a long time when the granulated polyolefin resin is subjected to the halogenation and accordingly the productivity is remarkably lowered. When a polyolefin powder before the granulation is subjected to the halogenation, it is possible to conduct uniform halogenation all over the individual powder, but such a work requires much labor and increases cost. Like this, the halogenation up to the inside of the particle is not required essentially, but it is of course permissible so long as the degree of halogenation is very low as compared with that of the surface region and the properties that a polyolefin resin originally possesses are not substantially impaired.

Any of fluorine, chlorine, bromine and iodine can be used in the halogenation. Chlorine is advantageous from the viewpoint of easiness in handling and cost.

The polyolefin particles having a halogenated surface region of the present invention are prepared, for instance, by dispersing polyolefin particles in water and irradiating ultraviolet rays to the particles in the presence of a halogen gas, for instance, with introducing the halogen gas to the aqueous dispersion of the particles, thus halaogenating the surface region of the particles. Certain kinds of polyolefin resins, e.g. low density polyethylene (density 0.920), can be halogenated even if ultraviolet rays are not utilized. The expandable polyolefin particles of the present invention are prepared by halogenating polyolefin particles in a manner as mentioned above and then impregnating the obtained particles with a volatile blowing agent, or by dispersing polyolefin particles in water, impregnating the particles with a volatile blowing agent, and then irradiating ultraviolet rays to the particles in the presence of a halogen gas, thereby halogenating the surface region of the particles. The impregnation can be conducted by known techniques.

The degree of halogenation can be controlled by changing the intensity and dose of ultraviolet rays, reaction temperature, reaction time, etc., and they are suitably selected according to the kind of polyolefin resin used and the desired quality of the product so that at least the surface region of a particle is chlorinated to form a barrier layer for preventing a blowing agent impregnated in the particle from leaking.

The present invention is more specifically described and explained by means of the following Examples, in which all parts and % are by weight unless otherwise noted.

EXAMPLE 1

A pressure reactor equipped with a stirrer was charged with 100 parts of a high pressure processed polyethylene (density 0.966, melt index 1.1) and 135 parts of water. To the reactor was added with stirring a solution or dispersion prepared by adding 0.45 part of dicumyl peroxide to 15 parts of water containing 0.05 part of an alkylbenzene sulfonate surfactant (commercially available under the trademark "NEOPELEX" made by Kao Atlas kabushiki Kaisha) at an elevated temperature with stirring. To the reactor was then added 50 parts of water containing 0.3 part of calcium phosphate, and after degassing, nitrogen was introduced into the reactor. The reactor was maintained at 100° C. for 2 hours and further at 140° C. for 4 hours, and was cooled to 40° C. The content was taken out, washed with water and dried, thus crosslinked polyethylene particles which were not fused together were obtained. The gel fraction (insoluble matter in boiling xylene for 48 hours) of the crosslinked polyethylene was 51%.

A glass reactor equipped with a stirrer was charged with 100 parts of the crosslinked polyethylene and 300 parts of water, and air in the reactor was replaced with nitrogen. The temperature of the system was raised to 70° C., and at that time when reached 70° C., chlorine gas was introduced into the system at a rate of 0.5 part/minute, while uniformly irradiating the system with a 100 W mercury lamp, to start the reaction. After conducting the reaction for 5 hours at 70° C., the irradiation and the chlorine introduction were stopped, and the reaction system was cooled to 40° C. The content was taken out, washed with water and dried to give crosslinked polyethylene particles having a chlorinated surface region.

The state of chlorination of the obtained particles was examined by an X-ray microanalyser. The region from the surface to the 100 μm inner position of the particle had been chlorinated. The maximum peak for the chlorine concentration appeared at the outermost surface of the particle, and the chlorine concentration thereof was 30%.

An autoclave was charged with 100 parts of the thus obtained chlorinated, crosslinked polyethylene particles, 120 parts of a 0.5% aqueous solution of polyvinyl alcohol and 25 parts of butane. The system was maintained at 100° C. for 6 hours with stirring, and after cooling the system, the particles were taken out and dried to give expandable particles.

The change in property of retaining a blowing agent with the lapse of time at 23° C. was examined in the open state.

The results are shown in Table 1 wherein the retention property for a blowing agent is shown by a weight percentage of the residual blowing agent to the initial amount of the blowing agent impregnated.

COMPARATIVE EXAMPLE 1

Expandable crosslinked polyethylene particles were prepared in the same manner as in Example 1 except that the chlorination of the surface region of the crosslinked polyethylene particles was not conducted.

The results are shown in Table 1.

EXAMPLE 2

A mixture of 100 parts of an ethylene-propylene random copolymer (density 0.90 g/cm$^3$, melt index 9, ethylene content about 4.5%) and 0.05 part of talc powder was extruded into pellets having a size of about 1.5 mm. A glass reactor equipped with a stirrer was charged with 100 parts of the pellets and 300 parts of water. After replacing with nitrogen, the system was raised to 70° C. and at that temperature, the chlorination was started by introducing chlorine gas at a rate of 0.5 part/minute with uniformly irradiating the system with a 100 W mercury lamp. After conducting the chlorination for 5 hours, the irradiation and the chlorine introduction were stopped, and the pellets were taken out, washed with water and dried sufficiently to give ethylene-propylene random copolymer particles having the chlorinated surface region.

The state of chlorination of the obtained particles was examined by an X-ray microanalyser. The region from the surface to the 120 μm inner position had been chlorinated. The highest degree of chlorination was observed at the outermost surface, and the chlorine concentration at that position was 33%.

An autoclave was charged with 100 parts of the obtained particles, 120 parts of a 0.5% aqueous solution of polyvinyl alcohol and 30 parts of butane. The system was raised to 120° C. with stirring and maintained for 6 hours at that temperature. After cooling, the particles were taken out of the autoclave and dried to give expandable particles. The blowing agent retention of the expandable particles was examined at 23° C. in the open state.

The results are shown in Table 1.

COMPARATIVE EXAMPLE 2

Expandable ethylene-propylene random copolymer particles were prepared in the same manner as in Example 2 except that the chlorination of the surface region was not conducted.

The results are shown in Table 1.

EXAMPLE 3

An autoclave equipped with a 100 W mercury lamp and a stirrer was charged with 100 parts of linear low density polyethylene particles (density 0.920, melt index 2.1) having an average particle size of 1.5 mm, 300 parts of water, 120 parts of a 0.5% aqueous solution of polyvinyl alcohol and 30 parts of butane. The temperature was raised to 60° C. with stirring, and the autoclave was kept at that temperature for 2 hours. After the lapse of 2 hours, chlorine gas was introduced into the autoclave at a rate of 0.5 part/minute, while irradiating ultraviolet rays from the mercury lamp. The reaction was carried out for 5 hours. After cooling the system, the particles were taken out, washed sufficiently with water, dehydrated and dried to give expandable particles. The blowing agent retention of the expandable particles was examined at 23° C. in the open state.

The results are shown in Table 1.

EXAMPLE 4

The procedures of Example 1 were repeated except that the chlorination was carried out at 20° C. for 1 hour.

The state of chlorination of the obtained particles was examined, and it was observed that the chlorination occurred in the region between the surface and the about 50 μm inner position, and the chlorine concentration for the maximum peak was 15%.

The results are shown in Table 1.

COMPARATIVE EXAMPLE 3

The procedures of Example 1 were repeated except that the chlorination was carried out at 20° C. for 30 minutes.

The state of chlorination of the obtained particles was examined, and it was observed that the chlorination occurred in the region between the surface and the about 30 μm inner position, and the chlorine concentration for the maximum peak was 7%.

The results are shown in Table 1.

Is is observed in Table 1 that polyolefin particles whose surface region is halogenated to the extent such that the miximum halogen concentration is at least 10% have a remarkably improved retention property for volatile blowing agents.

In addition to the ingredients used in the Examples, other ingredients can be used in the Examples as set forth in the specification to obtain substantially the same results.

TABLE 1

| | Depth of chlorinated surface region (μm) | Maximum chlorine concentration (%) | Content of blowing agent impregnated (%) | Blowing agent retention (Change in residual blowing agent with the lapse of time) (%) | | | |
|---|---|---|---|---|---|---|---|
| | | | | 1 hour | 1 day | 7 days | 20 days |
| Ex. 1 | 100 | 30 | 25.9 | 96.1 | 90.0 | 80.1 | 70.1 |
| Ex. 2 | 120 | 33 | 28.3 | 95.3 | 92.1 | 86 | 78 |
| Ex. 3 | 80 | 25 | 27.3 | 91.0 | 87.2 | 76.5 | 70.1 |
| Ex. 4 | 50 | 15 | 27.2 | 90.2 | 86.5 | 69.5 | 60.2 |
| Com. Ex. 1 | — | — | 28.1 | 13.2 | 0 | 0 | 0 |
| Com. Ex. 2 | — | — | 26.3 | 16.4 | 2.1 | 0 | 0 |
| Com. Ex. 3 | 30 | 7 | 27.2 | 50.1 | 18.2 | 9.3 | 5.2 |

What is claimed is:

1. A particle of a polyolefin whose surface region is chlorinated to the extent such that the chlorine concentration measured by an X-ray microanalyser and corresponding to the maximum peak in the region between the surface and the 200 μm inner position is at least 10% by weight calculated from the relative X-ray intensity ratio to a standard substance.

2. The particle of claim 1, wherein said surface region is chlorinated to the extent such that the chlorine concentration measured by an X-ray microanalyser and corresponding to the maximum peak in the region between the surface and the 200 μm inner position is at least 15% by weight calculated from the relative X-ray intensity ratio to a standard substance.

3. The particle of claim 1, wherein said polyolefin is at least one member selected from the group consisting of low density polyethylene, high density polyethylene, linear low density polyethylene, polypropylene, ethylene-propylene random copolymer, ethylene-vinyl acetate copolymer, ethylene-styrene graft copolymer, ethylene-vinyl acetate-styrene graft copolymer and chlorinated polyethylene.

4. The particle of claim 1, which has a particle size of 0.5 to 10 mm.

5. The particle of claim 1, which has a particle size of 0.5 to about 1.5 mm.

6. The particle of claim 1, wherein the thickness of the halogenated surface region is at most 120 um.

* * * * *